United States Patent [19]

Powers et al.

[11] 4,302,519

[45] Nov. 24, 1981

[54] PRODUCTION OF β-ALUMINA CERAMIC TUBES

[75] Inventors: Robert W. Powers, Schenectady; Stephan P. Mitoff, Clifton Park, both of N.Y.

[73] Assignee: General Electric Company, Schenectady, N.Y.

[21] Appl. No.: 180,600

[22] Filed: Aug. 25, 1980

[51] Int. Cl.³ .......................... H01M 2/00; F27D 3/00
[52] U.S. Cl. ..................................... 429/193; 432/11; 432/239
[58] Field of Search .............. 432/11, 19, 239; 13/21; 429/193

[56] References Cited

U.S. PATENT DOCUMENTS 4,070,542  1/1978  Miles et al. .................. 13/26

FOREIGN PATENT DOCUMENTS 2446566  4/1975  Fed. Rep. of Germany ...... 432/239
1297373  11/1972  United Kingdom .

Primary Examiner—John J. Camby
Attorney, Agent, or Firm—Jane M. Binkowski; James C. Davis, Jr.; Leo I. MaLossi

[57] ABSTRACT

A sintered β-alumina cylindrical tube of uniform shape is produced by placing the unsintered tube within a sagger, passing the sagger on friction-reducing balls through a horizontal firing tube and rotating the tube-containing sagger through the firing tube.

10 Claims, 1 Drawing Figure

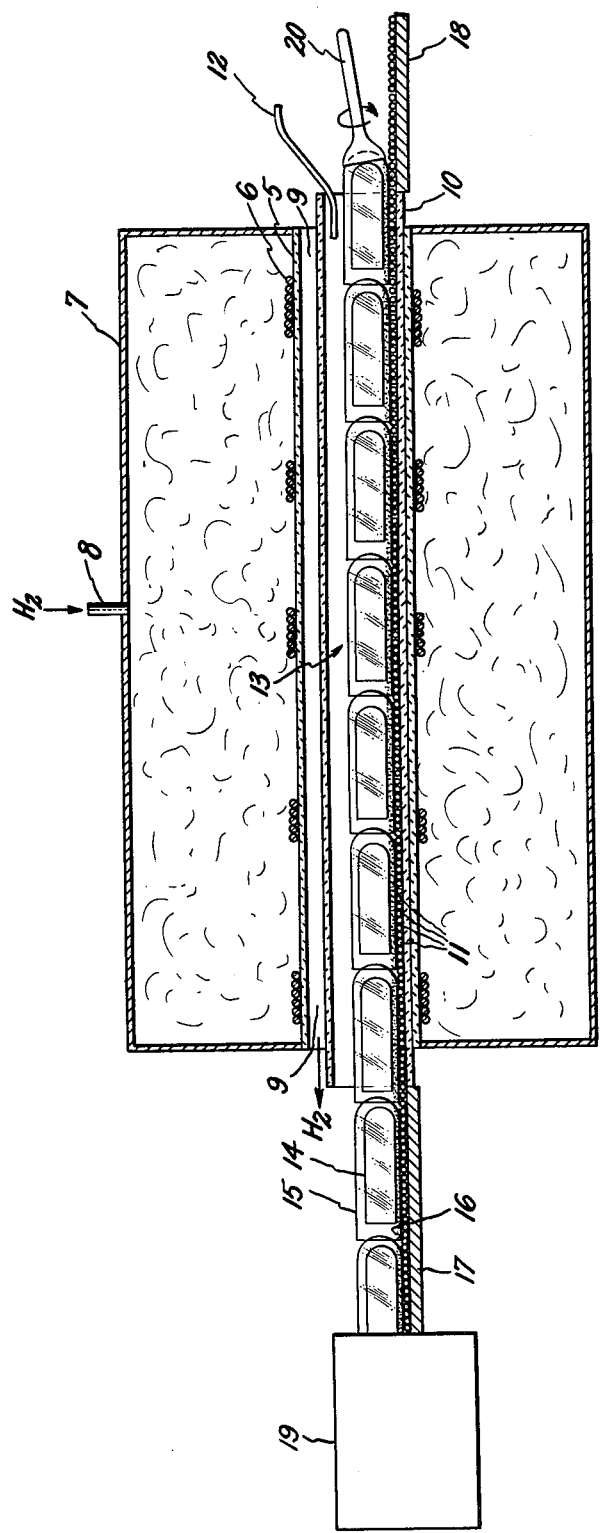

PRODUCTION OF β-ALUMINA CERAMIC TUBES

This invention relates to the elimination or substantial reduction of ovality or out-of-roundness in the production of sintered polycrystalline hollow ceramic tubes, particularly β-alumina tubes.

β-alumina as used herein includes β″-alumina, and it can be composed of a wide range of non-stoichiometric compounds of soda and alumina, i.e. $Na_2O.11Al_2O_3$ to $Na_2O.5Al_2O_3$. The β-alumina may also contain oxides such as those of magnesium and lithium.

Sintered thin-walled tubes of high density polycrystalline β-alumina are required for use as a solid electrolyte in sodium-sulfur cells. For such use, the tubes should be of uniform composition and roundness.

Conventional sintering techniques are usually not satisfactory for producing β-alumina tubes because with them temperatures must be closely controlled requiring a slow heating step which may effect density and cause variations in the composition of the sintered products.

British Pat. No. 1,297,373 to Miles et al. discloses the sintering of tubular or disc-shaped β-alumina articles by passing the articles through a horizontal tubular furnace having a short sintering zone thereby resulting in rapid heating and a short firing time.

U.S. Pat. No. 4,070,542 also to Miles et al. discloses the production of β-alumina articles by passing the shaped pierce through a continuously rotating horizontal tubular furnace having a short sintering zone.

In using a stationary horizontally-disposed sintering tube for the firing of β-alumina tubes, it has been found that excessive friction occurs between the sintering tube and the saggers containing the β-alumina tubes. When firing β-alumina tubes of about 2 centimeters diameter or larger, the friction was so great that the stoker mechanism used suitably for pushing the saggers containing 1 centimeter diameter tubes through the furnace was inadequate. Also, when the diameter of the β-alumina tubes was greater than about 2 centimeters, the resulting sintered were showed significant ovality of out-of-roundness which increased substantially with the diameter of the ware. For example, the out-of-roundness or diameter variation was much worse with 2.8 centimeters diameter tubes than with those of 1.0 centimeter diameter. If the cross-section of the tube is viewed as an ellipse, the major axis often exceeds the minor one by 8 to 10%. It can be inferred that out-of-roundness is caused by gravitational sag because the minor axis is aligned along the vertical direction. The tube is pushed in along the vertical direction and pulled out along the horizontal. Ovality complicates assembly of β-alumina tubes in sodium-sulfur cells and most likely will also interfere with performance. It is usually accompanied by bending of the tube. Both ovality and bending lead to a deleterious non-uniform current density over the surface of β-alumina tubes in operation in electrochemical cells.

One object of the present invention is to average out the effect of gravity and to produce sintered polycrystalline hollow tubes, particularly β-alumina tubes, of uniform shape. Specifically, in the present invention, the out-of-roundness problem is avoided by rotating the tube about its longitudinal axis during passage through the sintering furnace. The goal of this rotation is to expose any arbitrary point on the circumference of the tube to all angular positions for substantially the same amount of time. Consequently, the tube being sintered is pushed in and pulled out to the same degree at the arbitrary point and thereby it remains round.

Since the ware in the present invention enters the furnace green at one end of the sintering furnace, i.e. firing tube, and emerges sintered at the exit end, another object of the present invention is to reduce or eliminate the friction of the saggers passing through the furnace. In the present invention, both the sliding of the saggers through the firing tube and their rotation during this traverse is made possible by the use of a layer of friction-reducing balls, lying underneath and partially to the side of the saggers. These balls greatly reduce both sliding and rolling friction.

Briefly stated, the present method for producing a sintered polycrystalline ceramic hollow tube without significant out-of-roundness comprises shaping ceramic powder into a hollow green tube, providing a cylindrical sagger open at least on one end and having an inner volume at least sufficient to accommodate said green tube horizontally and allow said tube to rotate therein, disposing said sagger horizontally, disposing said green tube horizontally within said sagger, providing a substantially horizontally-disposed sintering or firing tube containing a sintering zone, providing a layer of friction-reducing spheres in the lower portion of said horizontally-disposed firing tube along the length thereof, providing said firing tube with an atmosphere which has no significant deleterious effect on said tube being sintered, heating said sintering zone to sintering temperature, passing said tube-containing sagger through said firing tube on said spheres, continuously and simultaneously advancing and rotating said sagger through said firing tube, said rotating being in a single direction and having no significant deleterious effect on said tube therewithin, the rate of rotation being at least one complete revolution of the sagger in an advancing distance equivalent to the outer circumference of the sagger, said sagger being advanced through said sintering zone at a rate appropriate to sinter said tube therewithin.

FIG. 1 illustrates the present process and also shows a diagrammatic section through one embodiment of a tubular furnace for sintering the present tubes, particularly β-alumina tubes.

Referring to FIG. 1, there is shown a tubular sintering furnace core 5, which in this particular embodiment is porous and can be made of polycrystalline α-alumina. The furnace core 5 is wound with a resistance heating wire 6, such as molybdenum wire. The furnace core 5 and wire 6 are disposed within housing 7, preferably a stainless steel housing containing alumina brick and powder insulation. Housing 7 has an inlet 8 for introducing hydrogen gas which passes through the housing and flows through the porous furnace core and is burned off at the open ends 9. Firing tube 10 is disposed within furnace core. Specifically, since β-alumina must be sintered in a non-reducing atmosphere, preferably one of pure oxygen, a firing tube of dense impervious polycrystalline α-alumina is inserted into the core. The firing tube in this embodiment extends preferably about six inches beyond the furnace core at both ends thereof. During sintering, the tube-containing saggers are made to traverse the firing tube through which flows preferably an atmosphere of oxygen. A layer of friction-reducing spheres 11 are arranged to rest on the bottom of firing tube 10, along the length thereof, and in this embodiment extending onto trays 17 and 18. Means 12, such as a gas injection means, provides the firing tube, including sintering zone 13, with an oxygen atmosphere. β-alumina tube 14 is separated from sagger 15 by β-alumina powder 16. Means such as extension tray 17 with the extended layer of friction-reducing spheres 11 is used to load the tube-containing saggers, and means such as unloading extension tray 18 containing extended layer of friction-reducing spheres 11 can be used for unloading the saggers. Means 19, such as a stoker mechanism, pulley or sprocket and chain, can be used for continuously pushing or stoking the tube-containing saggers 15 into and through the firing tube 10. Means 20, such as, for example, a spring-loaded retractable socket, can be used to rotate the tube-containing saggers as they pass through the firing tube and also to hold together the sagger train. In this embodiment the hydrogen gas envelopes the molybdenum to prevent its oxidation. In another embodiment, where a resistance heating wire such as a platinum-rhodium alloy wire is used, no hydrogen would be necessary and the furnace core could also serve as the firing tube and the layer of friction-reducing balls could be placed directly on the bottom of the furnace core. In a still other embodiment, the firing tube can be heated inductively using a susceptor.

The present invention is particularly useful for the production of thin-walled β-alumina sintered tubes having a wall thickness less than about 0.25 centimeter.

In carrying out the present process, a green hollow tube is shaped from β-alumina powder, or a mixture of reactant powders which produces β- and/or β''-alumina is used. Preferably, the powder or powders have an average particle size in their largest dimension less than about 5 microns, and most preferably submicron, to promote shrinkage to high densities. A number of techniques can be used to shape the powder into a green hollow tube. Preferably, the present tube is prepared by electrophoretic deposition, an example of which is disclosed in U.S. Pat. No. 3,900,381 to Powers. The green tube, preferably, should have a density of at least about 40% and preferably at least 50% of the theoretical density for β-alumina to promote densification during sintering and produce a sintered body having a density of at least 95%.

To protect the green unsintered tube and to prevent its contamination, it is positioned within a sagger. The sagger should be formed of a material which has no significant deleterious effect on the tube. The sagger is cylindrically shaped, sufficiently open at least on one end to receive the green tube, and preferably, it is sufficiently closed on the opposite end to prevent loss of its contents. The sagger should have a volume sufficient to accommodate the green tube in its substantially horizontal position. Normally the wall thickness of the sagger ranges from about 2 millimeters to about 4 millimeters.

For producing the present β-alumina tubes the sagger is usually an β-alumina tube but it can be made of β-alumina. Specifically to carry out the rotation, a green β-alumina tube is placed inside a sagger, usually an α-alumina tube, along with a small amount of β-alumina bedding powder of approximately the same composition as the green tube. The main purpose of the bedding powder is to inhibit loss of $Na_2O$ from the green tube. Alternatively β-alumina saggers may be used with or without bedding.

In the present invention, a horizontal or a substantially horizontal sintering of firing tube open at both ends is used. The inner surface portion or wall of the firing tube should be composed of a material which has no significant deleterious effect on the sintered product. Preferably, such inner surface of the sintering or firing tube is formed of polycrystalline α-alumina.

A layer of friction-reducing spheres or balls is positioned on the bottom, i.e. on the surface along the length of the lower portion of the substantially horizontally disposed firing tube. The layer of spheres or balls should be at least sufficiently large to prevent any significant direct contact of the saggers with the firing tube as the saggers are advanced and rotated through the firing tube. The spheres should be sufficiently large so as not to lodge in any cracks which might be present in the wall of the firing tube. The maximum size of the spheres is limited by the dimensions of the system, i.e. the size of the firing tube and the tubes being sintered. As a practical matter, the spheres may range from about 1.5 millimeters to about 10 millimeters in diameter. Spheres of the same or substantially the same size should be used in carrying out the present process. The spheres should have a smooth or at least a substantially smooth surface to promote reduction of friction. Also, the spheres should be formed of a material which has no significant deleterious effect on the present process. Preferably, for the production of β-alumina sintered tubes, the spheres are formed of polycrystalline α-alumina or zirconia.

As the tube-containing sagger is passed through the firing tube, in the lower portion of the firing tube it contacts the spheres rather than the wall of the firing tube, and the advancing rotating sagger turns the spheres thereby eliminating or substantially eliminating the friction that would have been produced by direct contact with that portion of the firing tube wall. The spheres also prevent breakage of the saggers as well as the firing tube. Rotation is at least sufficiently uniform so that all portions of the sagger, and therefore all portions of the tube within the sagger, are subjected on the average to the same effect of gravity. The minimum rate of rotation is at least one complete revolution of the sagger in an advancing distance equivalent to the outer circumference of the sagger to average out the effect of gravity. For example, a sagger with a diameter D of 5 centimeters must complete at least 1 revolution in an advancing distance of $\pi D$, or about 15 centimeters. The maximum rotation rate is determined by ware breakage.

The firing tube is provided with an atmosphere which has no significant deleterious effect on the tube being sintered. For producing sintered β-alumina tubes, the atmosphere in the firing tube should be a non-reducing dry atmosphere, and preferably an atmosphere having a dew-point less than about −20° C. Preferably, an atmosphere of oxygen is used. For producing the present β-alumina tubes, sintering temperatures may range from about 1525° C. to about 1825° C.

Preferably, and as a practical matter, a plurality of the tube-containing saggers are passed through the firing tube in a train as shown in FIG. 1. A train of saggers can be arranged with the closed end of a sagger inserted into the open end of the one ahead of it in the train. The train extends out both ends of the furnace onto extension means such as extension trays. The extension trays can be, for example, constructed of stainless steel tubing cut lengthwise into half-cylinders. With the train arrangement, saggers can be pushed through the furnace by a stoking machine operating at room temperature outside the furnace. Preferably, the train is compressed slightly and rotation of the saggers is accomplished by another device which also operates at room temperature outside the furnace. Such rotation is accomplished, preferably, by a motor-driven rotating socket-like arrangement which fits about the closed end of the lead sagger in the train. Other rotation schemes can also be used. For example, driver wheels can be used to rotate one sagger and thus the whole train. The driven sagger can be located at either the exit or the entrance end of the furnace.

$\beta$-alumina tubes are sintered to a density of at least about 95% of the theoretical density for $\beta$-alumina for use as an electrolyte. Most preferably, the density of the sintered $\beta$-alumina tubes is higher than about 98% of the theoretical density for $\beta$-alumina.

EXAMPLE $\beta$-alumina powder, having an average crystallite size of less than about 5 microns in its largest dimension, is formed into a green hollow tube having a density of 55% of theoretical. The green tube preferably has an inner diameter of about 3.0 centimeters, a wall thickness of about 0.2 centimeter, a length of about 47 centimeters and is open at one end and closed at the opposite end.

A polycrystalline $\alpha$-alumina sagger, open at one end and closed at the opposite end, preferably having an inner diameter of about 4.4 centimeters, a wall thickness of about 0.3 centimeter and a length of about 61 centimeters can be used.

A layer of $\beta$-alumina powder of about the same composition as the green tube is deposited along the length of the lower portion of the horizontally-disposed sagger, and the green $\beta$-alumina tube is positioned horizontally within the sagger being separated from the lower portion thereof by the powder. A plurality of such structures, i.e. powder-tube-containing saggers should be prepared.

The equipment used is substantially the same as shown in FIG. 1 wherein the furnace core is made of porous $\alpha$-alumina and the firing tube furnace is made of dense polycrystalline $\alpha$-alumina. The sintering zone is about 18 centimeters in length and is located about midway between the ends of the furnace firing tube. The friction-reducing spheres are polycrystalline $\alpha$-alumina preferably about 0.07 centimeter in diameter, and having a smooth surface. A layer of such spheres covers the surface of the lower portion of the firing tube along the length thereof as shown in FIG. 1.

The sintering atmosphere is oxygen with a dew-point of less than $-20°$ C., and it is introduced into the firing tube at a rate of about 8 liters per minute. The sintering temperature is about 1650° C.

A train of connecting saggers can be formed by fitting the closed end of one sagger into the open end of the next sagger. The saggers in the train are rotated in a single direction by turning the leading sagger either manually or by a motor driven socket and arm arrangement. There is one rotation of the sagger per centimeter of travel. Such turning is sufficient to rotate the tube within the sagger and is sufficient to make the powder tumble within the sagger to prevent significant continuous contact between the rotating tube and sagger as it passes through the firing tube. The train of saggers should pass through the firing tube on the layer of friction-reducing spheres at a rate of about 2 centimeters per minute.

The resulting sintered $\beta$- and/or $\beta''$-alumina tubes have a density higher than 98% of the full density of $\beta$-alumina. They should have no significant ovality or out-of-roundness, and each should be of substantially uniform shape. The wall thickness of each sintered $\beta$-alumina tube should be about 0.2 centimeter.

These sintered $\beta$-alumina tubes can be used as electrolyte in a sodium-sulfur battery.

Ser. No. 180,601, filed Aug. 25, 1980, entitled PRODUCTION OF $\beta$-ALUMINA CERAMIC TUBES filed of even date herewith in the names of V. J. DeCarlo, R. W. Powers and S. P. Mitoff and assigned to the assignee hereof discloses the production of a sintered $\beta$-aliumina hollow tube of uniform shape by placing the unsintered tube within a sagger, passing the sagger on friction-reducing balls through a horizontal firing tube and continuously alternately rotating the tube-containing sagger through the firing tube so that all portions of the tube being sintered are subjected on the average to the same action of gravity.

What is claimed is:

1. A method for producing a sintered polycrystalline ceramic hollow cylindrical tube open at least on one end without significant out-of-roundness which comprises shaping ceramic powder into a cylindrical hollow green tube, providing a cylindrical sagger open at least on one end and having an inner volume at least sufficient to accommodate said green tube substantially horizontally and allow said tube to rotate therein, disposing said green tube substantially horizontally within said sagger, providing a substantially horizontally disposed open-ended firing tube containing a sintering zone, positioning a layer of friction-reducing spheres on the surface of the lower portion of said horizontally-disposed firing tube along the length thereof, providing said firing tube with an atmosphere which has no significant deleterious effect on said tube being sintered, heating said sintering zone to sintering temperature, passing said tube-containing sagger through said firing tube on said spheres, continuously advancing and simultaneously rotating said tube-containing sagger through said firing tube, said advancement and rotation having no significant deleterious effect on said tube therewithin, the rate of rotation being at least one complete revolution of the sagger in an advancing distance equivalent to the outer circumference of the sagger, said sagger being advanced through said sintering zone at a rate appropriate to sinter said tube therewithin.

2. A method for producing a sintered polycrystalline cylindrical hollow tube of $\beta$-alumina, $\beta''$-alumina and mixtures thereof without significant out-of-roundness which comprises shaping a green hollow cylindrical tube from $\beta$-alumina powder or a mixture of reactant powders which react to produce $\beta$- and/or $\beta''$-alumina at an elevated temperature below or at sintering temperature, said green tube being open at least on one end, providing a cylindrical sagger open at least on one end and having an inner volume at least sufficient to accommodate said green tube substantially horizontally and allow said green tube to rotate therein, disposing said green tube substantially horizontally within said sagger, providing a substantially horizontally-disposed open-ended firing tube containing a sintering zone, positioning a layer of friction-reducing spheres on the surface of the lower portion of said horizontally disposed firing tube along the length thereof, providing said sintering zone with a non-reducing dry atmosphere which has no significant deleterious effect on said tube being sintered, heating said sintering zone to a sintering temperature ranging from about 1525° C. to about 1825° C., passing said tube-containing sagger through said firing tube on said spheres, continuously advancing and simultaneously rotating said sagger through the firing tube, said advancement and rotation having no significant deleterious effect on said tube therewithin, the rate of rotation being at least one complete revolution of the sagger in an advancing distance equivalent to the outer circumference of the sagger, said sagger being advanced through said sintering zone at a rate appropriate to sinter said tube therewithin to a density of at least 95% of the theoretical density of $\beta$-alumina.

3. A method according to claim 2 wherein said sagger consists essentially of polycrystalline $\alpha$-alumina.

4. A method according to claim 3 wherein said sagger contains $\beta$-alumina powder.

5. A method according to claim 2 wherein said sagger consists essentially of polycrystalline $\beta$-alumina.

6. A method according to claim 2 wherein a train of connecting tube-containing saggers is passed through said firing tube.

7. A method according to claim 2 wherein said sagger is passed through the sintering zone at a rate ranging from about $\frac{1}{4}$ inch per minute to about 4 inches per minute.

8. A method according to claim 1 wherein said spheres range in diameter from about 1.5 millimeters to about 10 millimeters.

9. A method according to claim 1 wherein a train of connecting tube-containing saggers is passed through said firing tube.

10. An electrolyte consisting essentially of a sintered polycrystalline uniformly hollow cylindrical tube having a thickness less than about 0.25 cm. comprised of a material selected from the group consisting of $\beta$-alumina, $\beta''$-alumina and mixtures thereof, and produced by the process of claim 2.

* * * * *